United States Patent
Chang

(10) Patent No.: US 11,387,742 B2
(45) Date of Patent: Jul. 12, 2022

(54) FULL-BRIDGE RESONANT CONVERSION CIRCUIT

(71) Applicant: SEA SONIC ELECTRONICS CO., LTD., Taipei (TW)

(72) Inventor: Chih-Sheng Chang, Taipei (TW)

(73) Assignee: SEA SONIC ELECTRONICS CO., LTD., Taipei (TW)

( * ) Notice: Subject to any disclaimer, the term of this patent is extended or adjusted under 35 U.S.C. 154(b) by 0 days.

(21) Appl. No.: 16/564,557

(22) Filed: Sep. 9, 2019

(65) Prior Publication Data

US 2021/0075332 A1 Mar. 11, 2021

(51) Int. Cl.
*H02M 3/335* (2006.01)

(52) U.S. Cl.
CPC ... *H02M 3/33592* (2013.01); *H02M 3/33507* (2013.01)

(58) Field of Classification Search
CPC ..................................................... H02M 3/335
See application file for complete search history.

(56) References Cited

U.S. PATENT DOCUMENTS

| | | | | |
|---|---|---|---|---|
| 2010/0182814 A1* | 7/2010 | Tada | ................. | H02M 3/33584 363/134 |
| 2013/0201726 A1* | 8/2013 | Hu | ......................... | H02M 3/28 363/17 |
| 2013/0343091 A1* | 12/2013 | Njiende T. | .............. | H01F 27/28 363/16 |
| 2017/0054378 A1* | 2/2017 | Njiende T. | .............. | H02M 1/42 |
| 2018/0191235 A1* | 7/2018 | Chen | ....................... | H01F 27/24 |
| 2018/0351469 A1* | 12/2018 | Kakalashvili | .......... | H02M 1/34 |

FOREIGN PATENT DOCUMENTS

| | | |
|---|---|---|
| CN | 103595259 B | 3/2016 |
| CN | 106329940 A | 1/2017 |
| CN | 206341145 U | 7/2017 |

* cited by examiner

*Primary Examiner* — Nguyen Tran
(74) *Attorney, Agent, or Firm* — Muncy, Geissler, Olds & Lowe, P.C.

(57) ABSTRACT

A full-bridge resonant conversion circuit comprises a full-bridge rectification unit, a resonant unit, a first transformer, a second transformer and a synchronous rectification unit, wherein the full-bridge rectification unit comprises a first connection end and a second connection end, the resonant unit comprises a first resonant inductor, a resonant capacitor and a second resonant inductor, the resonant capacitor is connected in series with the first resonant inductor or the second resonant inductor. The first transformer comprises a first primary winding connected in series with the first resonant inductor, and a first secondary winding. Also, the second transformer comprises a second primary winding connected in series with the first primary winding and connected with the second resonant inductor, and a second secondary winding connected in parallel with the first secondary winding, and the synchronous rectification unit is connected with the first secondary winding and the second secondary winding.

8 Claims, 4 Drawing Sheets

FULL-BRIDGE RESONANT CONVERSION CIRCUIT

FIELD OF THE INVENTION

The invention relates to a full-bridge resonant conversion circuit, in particular to a full-bridge resonant conversion circuit implemented by double transformers.

BACKGROUND OF THE INVENTION

The Chinese invention patents CN 106329940A, CN 103595259B and the Chinese utility model patent CN 2063411450 respectively disclose a resonant conversion circuit implemented by double transformers. However, when being used in different power input paths, LLC resonant circuits adopted in the patents above can produce phase differences at secondary sides of the double transformers connected to a rear end, so that a back-end circuit of the double transformers is not easy to control. In addition, since circuits disclosed by the existing patents even cause high-frequency oscillation at the secondary sides of the double transformers, electric components connected at back end of the double transformers needs to have relatively high withstanding voltage conditions, and thus the development cost is increased.

SUMMARY OF THE INVENTION

A main object of the present invention is to solve the problems caused by the fact that conventional circuits is likely to produce phase differences and high-frequency oscillation at secondary sides of transformers.

In order to achieve the object above, the present invention provides a full-bridge resonant conversion circuit which comprises a full-bridge rectification unit, a resonant unit, a first transformer, a second transformer and a synchronous rectification unit. The full-bridge rectification unit comprises a first connection end and a second connection end, the resonant unit comprises a first resonant inductor, a resonant capacitor and a second resonant inductor, wherein the resonant capacitor is connected in series with the first resonant inductor or the second resonant inductor. The first transformer comprises a first primary winding connected in series with the first resonant inductor and a first secondary winding magnetically coupled with the first primary winding. Further, the second transformer comprises a second primary winding connected in series with the first primary winding and connected with one end of the second resonant inductor which is not connected with the resonant capacitor, and a second secondary winding magnetically coupled with the second primary winding and connected in parallel with the first secondary winding, and the synchronous rectification unit is connected with the first secondary winding and the second secondary winding.

In an embodiment, the first secondary winding comprises a first sub-winding, a second sub-winding connected with the first sub-winding, a first output end connected with the first sub-winding, a second output end connected with the second sub-winding, a first tapped output end connected between the first sub-winding and the second sub-winding, and the second secondary winding comprises a third sub-winding, a fourth sub-winding connected with the third sub-winding, a third output end connected with the third sub-winding, a fourth output end connected with the fourth sub-winding, and a second tapped output end connected between the third sub-winding and the fourth sub-winding and connected with the first tapped output end.

In an embodiment, the polarity of the first sub-winding and the second sub-winding is the same as the polarity of the first primary winding, and the polarity of the third sub-winding and the fourth sub-winding is the same as the polarity of the second primary winding.

In an embodiment, the full-bridge rectification unit comprises a first bridge arm and a second bridge arm, the first bridge arm comprises a first switch and a second switch connected in series with the first switch, the first connection end is formed between the first switch and the second switch. The second bridge arm comprises a third switch and a fourth switch connected in series with the third switch, and the second connection end is formed between the third switch and the fourth switch.

In an embodiment, the synchronous rectification unit comprises a power reference (GND), a power output end connected with the first tapped output end and the second tapped output end, a fifth switch connected with the first output end and the power reference, and a sixth switch connected with the second output end and the power reference, a seventh switch connected with the third output end and the power reference, and an eighth switch connected with the fourth output end and the power reference.

In an embodiment, the first switch, the second switch, the third switch, the fourth switch, the fifth switch, the sixth switch, the seventh switch, and the eighth switch are respectively a metal-oxide-semiconductor field-effect transistor (MOSFET).

In an embodiment, the synchronous rectification unit comprises at least one capacitor connected with the power output end and the power reference.

Through the embodiments of the present invention above, compared with the prior art, the present invention has the following characteristics: in the present invention, the first resonant inductor and the second resonant inductor are symmetrically disposed in the resonant unit, so that whether power enters from the first connection end or the second connection end, the magnetic hysteresis of the first transformer and the second transformer are the same. As a result, the output of the first transformer and the output of the second transformer do not produce phase difference, the control of the synchronous rectification unit is able to be optimized, and then overall efficiency of the full-bridge resonant conversion circuit is improved. In addition, the circuit of the present invention reduces high-frequency oscillation of series loops of the first secondary winding and the second secondary winding, thereby reducing the surge generated at the moment when the switches to which the synchronous rectification unit belongs is conducted, the withstanding voltage conditions of the switches to which the synchronous rectification unit belongs are reduced.

DETAILED DESCRIPTION OF THE PREFERRED EMBODIMENTS

Figure 1:
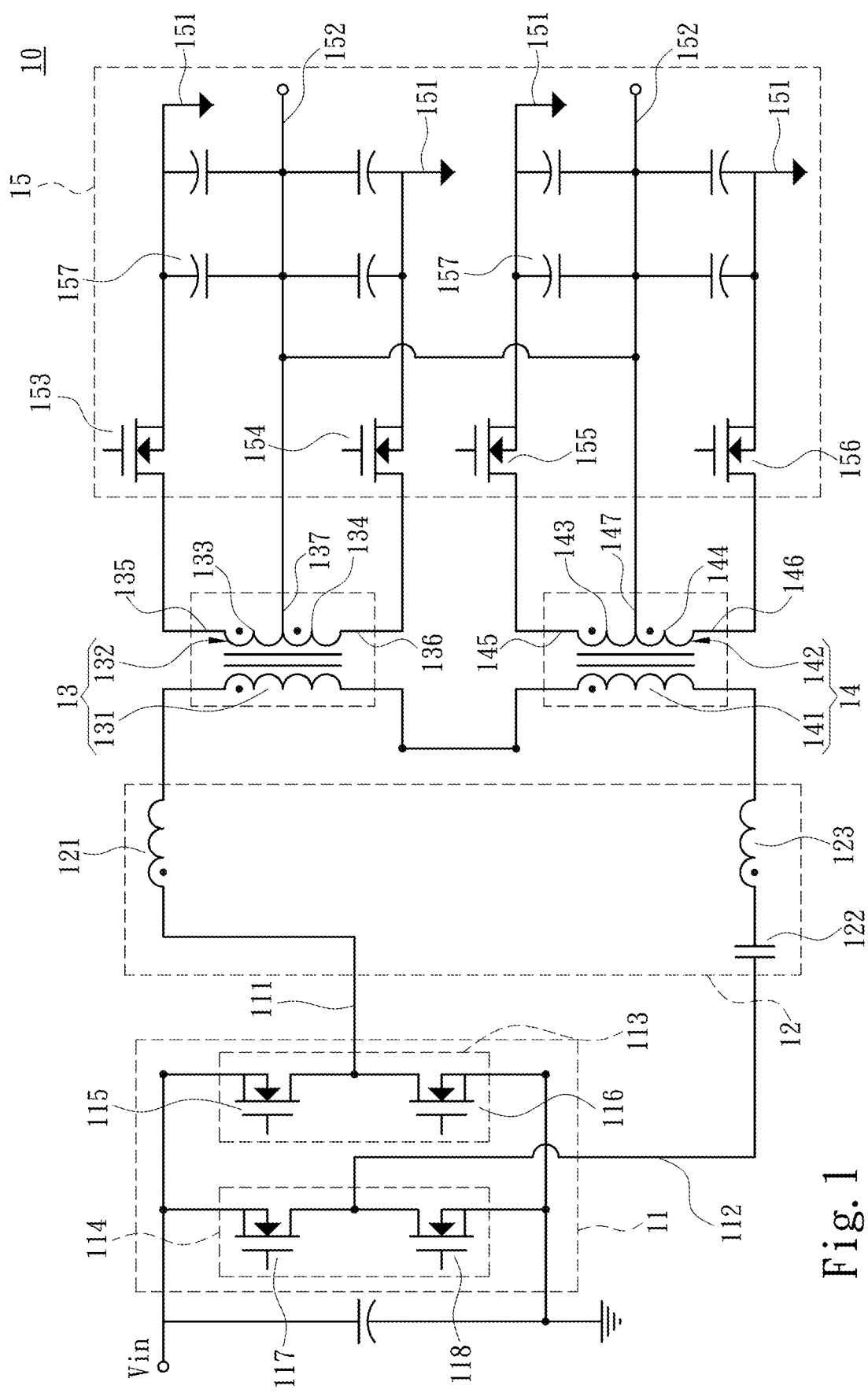
FIG. 1 is a circuit schematic diagram of an embodiment of the present invention.

The detailed description and technical contents of the present invention will now be described with reference to the drawings as follows:

Referring to FIG. 1, the present invention provides a full-bridge resonant conversion circuit 10, which can be used on a power supply or a vehicle power system, wherein the power supply may be a power supply of ATX specifications used by the general public, a power supply of a server, or an industrial power supply. Further, the full-bridge resonant conversion circuit 10 comprises a full-bridge rectification unit 11, a resonant unit 12, a first transformer 13, a second transformer 14, and a synchronous rectification unit 15, wherein the full-bridge rectification unit 11 serves as a portion for connecting the full-bridge resonant conversion circuit 10 with an external power, and the external power is rectified and provided to a rear-end circuit such as the resonant unit 12 after entering the full-bridge rectification unit 11. Further, the full-bridge rectification unit 11 comprises a first connection end 111 and a second connection end 112. It can be understood that the first connection end 111 and the second connection end 112 does not serve as the portion of the full-bridge rectification unit 11 for connecting with the external power. The full-bridge rectification unit 11 is controlled to output power from the first connection end 111 or the second connection end 112. Specifically, in an embodiment, the full-bridge rectification unit 11 comprises a first bridge arm 113 and a second bridge arm 114, wherein the first bridge arm 113 comprises a first switch 115 and a second switch 116 connected in series with the first switch 115, the first connection end 111 is formed between the first switch 115 and the second switch 116. The second bridge arm 114 comprises a third switch 117 and a fourth switch 118 connected in series with the third switch 117, and the second connection end 112 is formed between the third switch 117 and the fourth switch 118. To prevent Dead Time from occurring, the second switch 116 is cut off when the first switch 115 is conducted, and the fourth switch 118 is cut off when the third switch 117 is conducted. In addition, the first bridge arm 113 and the second bridge arm 114 are alternately controlled, specifically, when the first switch 115 is conducted, the third switch 117 is cut off, and the fourth switch 118 is conducted. Likewise, when the second switch 116 is conducted, the third switch 117 is conducted, and the fourth switch 118 is cut off. Thus, when the full-bridge rectification unit 11 is implemented, power is output from the first connection end 111 or the second connection end 112 according to control conditions of the switches 115, 116, 117, and 118. In an embodiment, the first switch 115, the second switch 116, the third switch 117, and the fourth switch 118 may be a metal-oxide-semiconductor field-effect transistor (MOSFET), respectively. Furthermore, the first switch 115, the second switch 116, the third switch 117 and the fourth switch 118 are respectively controlled by a control module (not shown in the figure) when being implemented.

Figure 2:
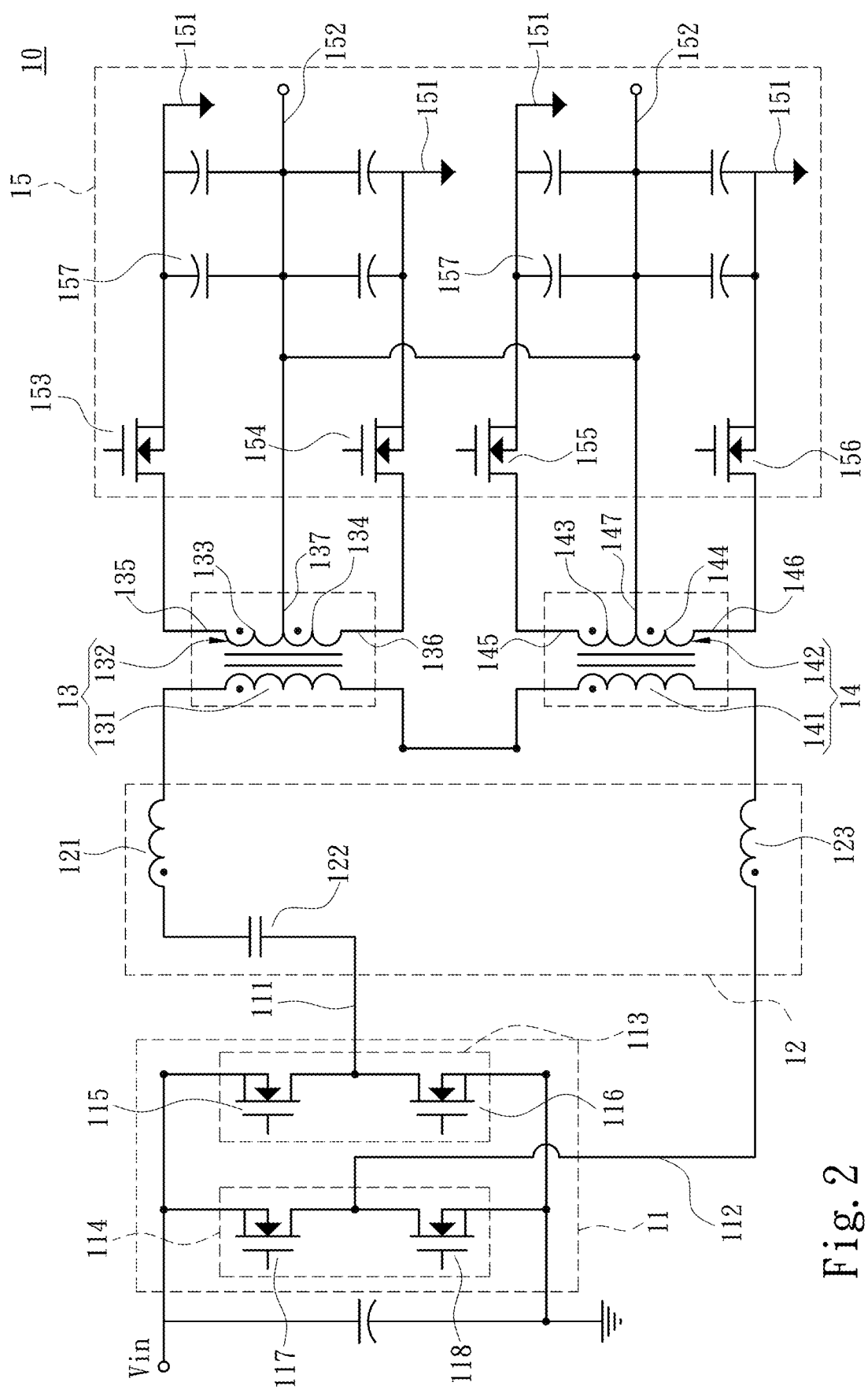
FIG. 2 is a circuit schematic diagram of another embodiment of the present invention.

Further, the resonant unit 12 is an LLC architecture, and the resonant unit 12 is connected with the first connection end 111 and the second connection end 112. The resonant unit 12 comprises a first resonant inductor 121, a resonant capacitor 122 and a second resonant inductor 123, wherein the resonant capacitor 122 may be connected in series with the first resonant inductor 121 or the second resonant inductor 123. For example, in the embodiment disclosed in FIG. 1, one end of the resonant capacitor 122 is connected in series with the second resonant inductor 123 and the other end of the resonant capacitor 122 is connected with the second connection end 112. Furthermore, in the embodiment disclosed in FIG. 2, one end of the resonant capacitor 122 is connected in series with the first resonant inductor 121 and the other end of the resonant capacitor 122 is connected with the first connection end 111. On the other hand, the first transformer 13 comprises a first primary winding 131 connected in series with the first resonant inductor 121 and a first secondary winding 132 magnetically coupled with the first primary winding 131. Further, the second transformer 14 comprises a second primary winding 141 connected in series with the first primary winding 131 and connected with the second resonant inductor 123, and a second secondary winding 142 magnetically coupled with the second primary winding 141 and connected in parallel with the first secondary winding 132, the first secondary winding 132 and the second secondary winding 142 are respectively connected with the synchronous rectification unit 15.

Accordingly, the resonant unit 12 of the present invention is provided with the first resonant inductor 121 and the second resonant inductor 123 which are disposed in a symmetrical manner, so that a magnetic path distance from the first resonant inductor 121 to the second primary winding 141 is the same as a magnetic path distance from the second resonant inductor 123 to the first primary winding 131. Thus, whether power enters from the first connection end 111 or the second connection end 112, the magnetic hysteresis of the first transformer 13 and the second transformer 14 are the same. As a result, the output of the first transformer 13 and the second transformer 14 do not produce phase difference, the control of the synchronous rectification unit 15 is able to be optimized, and then the overall efficiency of the full-bridge resonant conversion circuit 10 is improved.

Referring again to FIG. 1, in an embodiment, the first secondary winding 132 comprises a first sub-winding 133, a second sub-winding 134 connected with the first sub-winding 133, a first output end 135 connected with the first sub-winding 133, a second output end 136 connected with the second sub-winding 134, and a first tapped output end 137 connected between the first sub-winding 133 and the second sub-winding 134. Further, the second secondary winding 142 comprises a third sub-winding 143, a fourth sub-winding 144 connected with the third sub-winding 143, a third output end 145 connected with the third sub-winding 143, a fourth output end 146 connected with the fourth sub-winding 144, and a second tapped output end 147 connected between the third sub-winding 143 and the fourth sub-winding 144 as well as connected with the first tapped output end 137. Further, the polarity of the first sub-winding 133 and the second sub-winding 134 is the same as the polarity of the first primary winding 131, and the polarity of the third sub-winding 143 and the fourth sub-winding 144 is the same as the polarity of the second primary winding 141.

Accordingly, referring to FIG. 1, in an embodiment, the synchronous rectification unit 15 comprises a power reference 151 (GND), a power output end 152 connected with the first tapped output end 137 and the second tapped output end 147, a fifth switch 153 connected with the first output end 135 and the power reference 151, a sixth switch 154 connected with the second output end 136 and the power reference 151, a seventh switch 155 connected with the third output end 145 and the power reference 151, and an eighth switch 156 connected with the fourth output end 146 and the power reference 151. Further, the fifth switch 153, the sixth switch 154, the seventh switch 155, and the eighth switch 156 may be a metal-oxide-semiconductor field-effect transistor (MOSFET), respectively, wherein the fifth switch 153 is connected with the first output end 135 at a drain electrode (D pole) and connected with the power reference 151 at a source electrode (S pole). Further, the sixth switch 154 is connected with the second output end 136 at a drain electrode (D pole) and connected with the power reference 151 at a source electrode (S pole). Further, the seventh switch 155 is connected with the third output end 145 at a drain electrode (D pole) and connected with the power reference 151 at a source electrode (S pole). Further, the eighth switch 156 is connected with the fourth output end 146 at a drain electrode (D pole) and connected with the power reference 151 at a source electrode (S pole). Furthermore, the fifth switch 153, the sixth switch 154, the seventh switch 155, and the eighth switch 156 are respectively controlled by the control module when being implemented.

Figure 3:
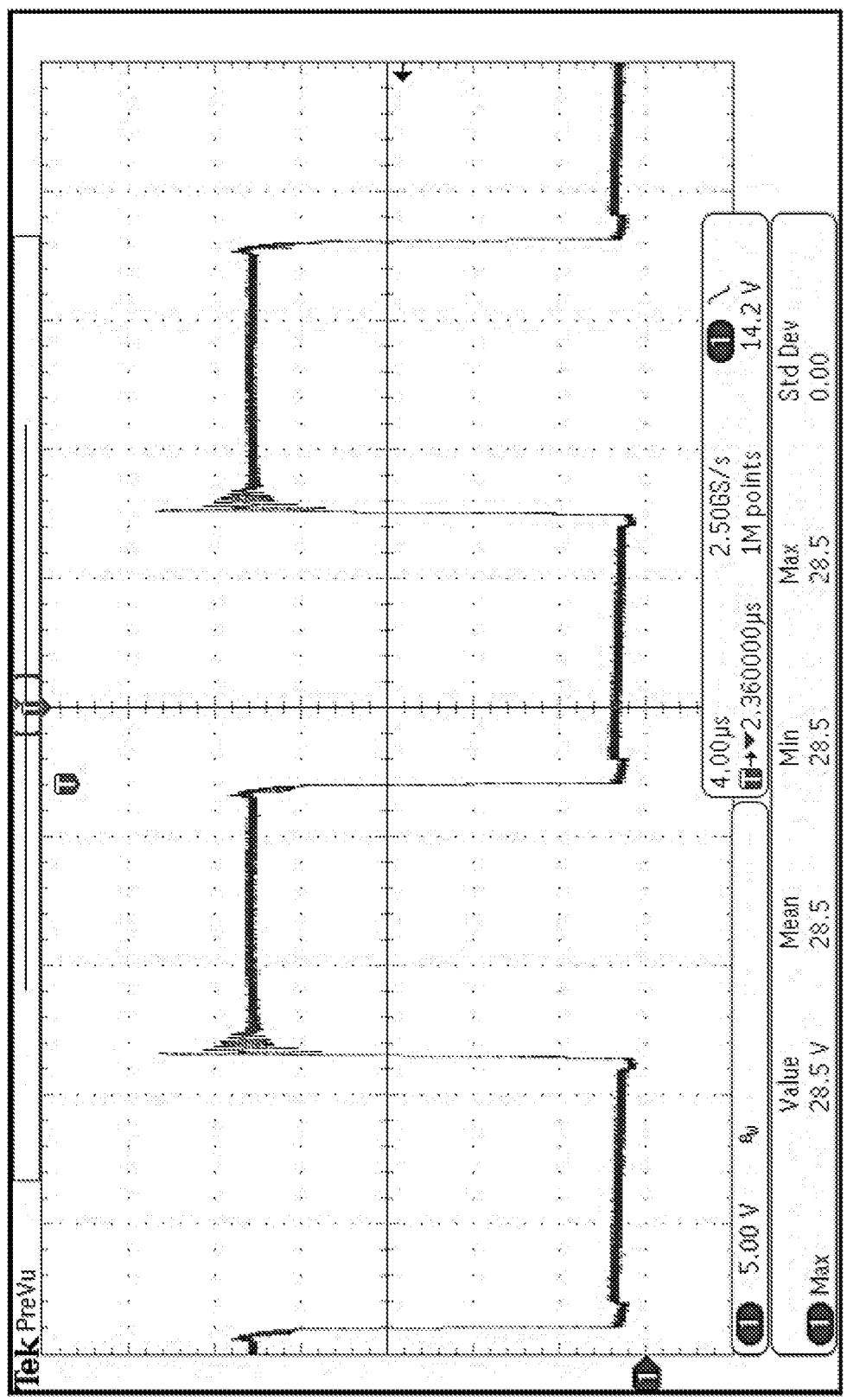
FIG. 3 is a schematic diagram of operating waveforms of a switch disposed at a secondary side of a transformer according to the present invention.
Figure 4:
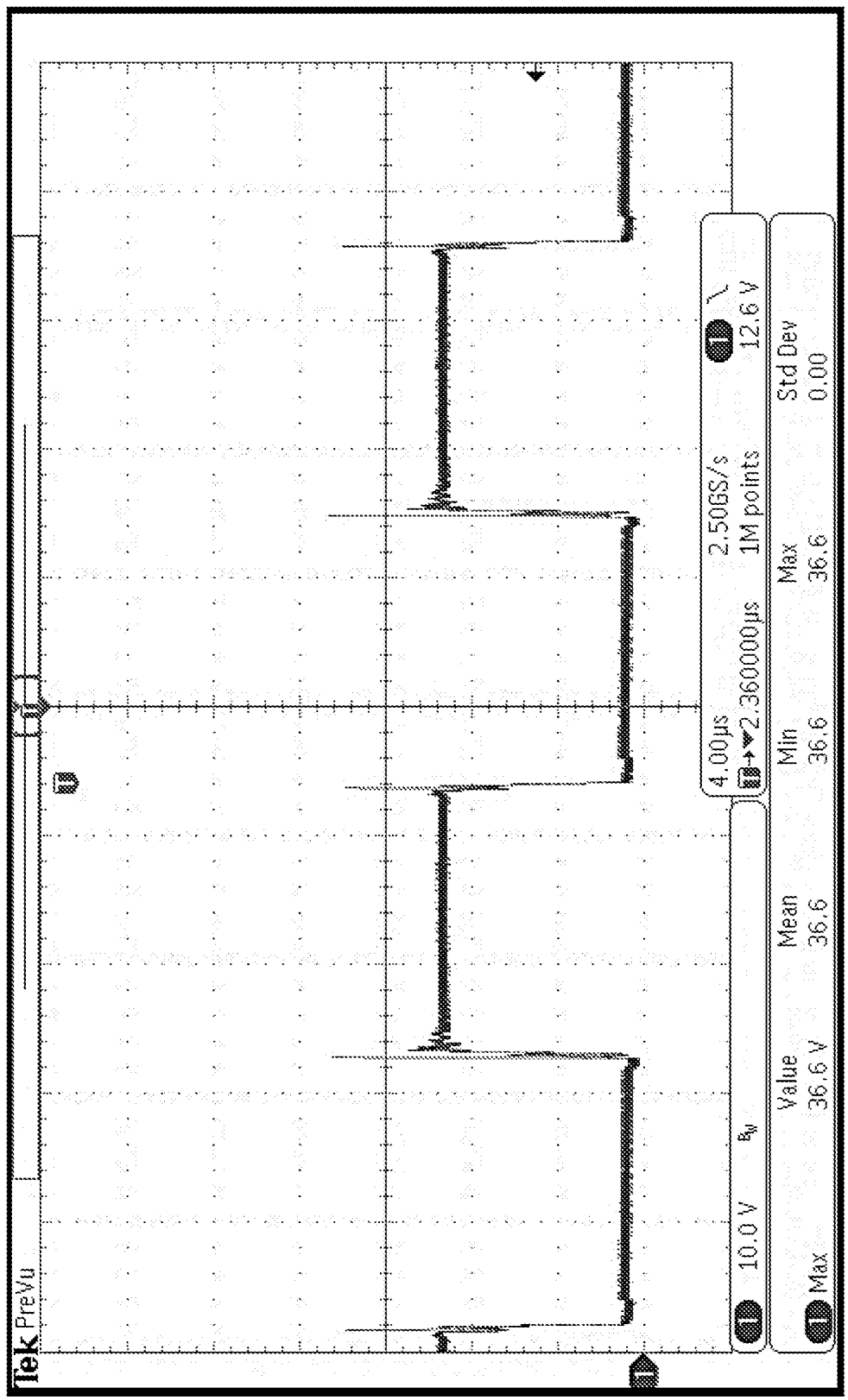
FIG. 4 is a schematic diagram of operating waveforms of a conventional switch disposed at the secondary side of the transformer.

Accordingly, referring to FIG. 3 and FIG. 4, FIG. 3 is a schematic diagram of operating waveforms of one of the switches disposed at a secondary side of a transformer according to the present invention, and FIG. 4 is a schematic diagram of operating waveforms of one of switches disposed at the secondary side of the transformer of a conventional circuit. It is clearly showing from FIG. 3 and FIG. 4 that the circuit of the present invention reduces high-frequency oscillation of series loops of the first secondary winding 132 and the second secondary winding 142, thereby reducing the surge generated at the moment when the fifth switch 153, the sixth switch 154, the seventh switch 155, and the eighth switch 156 are conducted, so that the withstanding voltage conditions of the fifth switch 153, the sixth switch 154, the seventh switch 155, and the eighth switch 156 are reduced. In addition, Voltages (Vds) between the source electrodes and the drain electrodes of the fifth switch 153, the sixth switch 154, the seventh switch 155, and the eighth switch 156 are balanced by the circuit of the present invention. Furthermore, in an embodiment, the synchronous rectification unit 15 comprises at least one capacitor 1157 connected with the power output end 152 and the power reference 151, wherein the positive pole of the at least one capacitor 157 is connected with the power output end 152, and the negative pole of the at least one capacitor 157 is connected with the power reference 151.

What is claimed is:

1. A full-bridge resonant conversion circuit comprising:
   a full-bridge rectification unit, comprising a first connection end and a second connection end;
   a resonant unit, connected with the first connection end and the second connection end, the resonant unit comprising a first resonant inductor, a resonant capacitor and a second resonant inductor;
   a first transformer, comprising a first primary winding connected with the first resonant inductor and a first secondary winding magnetically coupled with the first primary winding, wherein the first secondary winding comprises a first sub-winding, a second sub-winding connected with the first sub-winding, a first output end connected with the first sub-winding, a second output end connected with the second sub-winding, a first tapped output end connected between the first sub-winding and the second sub-winding, and a polarity of each of the first sub-winding and the second sub-winding is the same as a polarity of the first primary winding;
   a second transformer, comprising a second primary winding connected with the first primary winding and connected with the second resonant inductor, and a second secondary winding magnetically coupled with the second primary winding and connected in parallel with the first secondary winding, wherein the second secondary winding comprises a third sub-winding, a fourth sub-winding connected with the third sub-winding, a third output end connected with the third sub-winding, a fourth output end connected with the fourth sub-winding, a second tapped output end connected between the third sub-winding and the fourth sub-winding and connected with the first tapped output end, and a polarity of each of the third sub-winding and the fourth sub-winding is the same as a polarity of the second primary winding; and
   a synchronous rectification unit, connected with the first secondary winding and the second secondary winding;
   wherein the first resonant inductor, the first primary winding, the second primary winding, and the second resonant inductor are sequentially connected in series, the first primary winding and the second primary winding are directly connected in series without other component therebetween, the resonant capacitor is connected in series between the first resonant inductor and the first connection end or between the second resonant inductor and the second connection end, a polarity end of the first resonant inductor and a polarity end of the second resonant inductor are respectively connected to the resonant capacitor and the full-bridge rectification unit, and a magnetic path distance from the first resonant inductor to the second primary winding is the same as a magnetic path distance from the second resonant inductor to the first primary winding.

2. The full-bridge resonant conversion circuit of claim 1, wherein the full-bridge rectification unit comprises a first bridge arm and a second bridge arm, the first bridge arm comprises a first switch and a second switch connected in series with the first switch, the first connection end is formed between the first switch and the second switch, the second bridge arm comprises a third switch and a fourth switch connected in series with the third switch, and the second connection end is formed between the third switch and the fourth switch.

3. The full-bridge resonant conversion circuit of claim 2, wherein the synchronous rectification unit comprises a power reference (GND), a power output end connected with the first tapped output end and the second tapped output end, a fifth switch connected with the first output end and the power reference, a sixth switch connected with the second output end and the power reference, a seventh switch connected with the third output end and the power reference, and an eighth switch connected with the fourth output end and the power reference.

4. The full-bridge resonant conversion circuit of claim 3, wherein the first switch, the second switch, the third switch, the fourth switch, the fifth switch, the sixth switch, the seventh switch, and the eighth switch are respectively a metal-oxide-semiconductor field-effect transistor (MOSFET).

5. The full-bridge resonant conversion circuit of claim 1, wherein the synchronous rectification unit comprises a power reference (GND), a power output end connected with the first tapped output end and the second tapped output end, a fifth switch connected with the first output end and the power reference, a sixth switch connected with the second output end and the power reference, a seventh switch connected with the third output end and the power reference, and an eighth switch connected with the fourth output end and the power reference.

6. The full-bridge resonant conversion circuit of claim 5, wherein the fifth switch, the sixth switch, the seventh switch, and the eighth switch are respectively a metal-oxide-semiconductor field-effect transistor (MOSFET).

7. The full-bridge resonant converter circuit of claim 5, wherein the synchronous rectification unit comprises at least one capacitor connected with the power output end and the power reference.

8. The full-bridge resonant conversion circuit of claim 1, wherein the full-bridge rectification unit comprises a first bridge arm and a second bridge arm, the first bridge arm comprises a first switch and a second switch connected in series with the first switch, the first connection end is formed between the first switch and the second switch, the second bridge arm comprises a third switch and a fourth switch connected in series with the third switch, and the second connection end is formed between the third switch and the fourth switch.

* * * * *